Patented Feb. 20, 1934

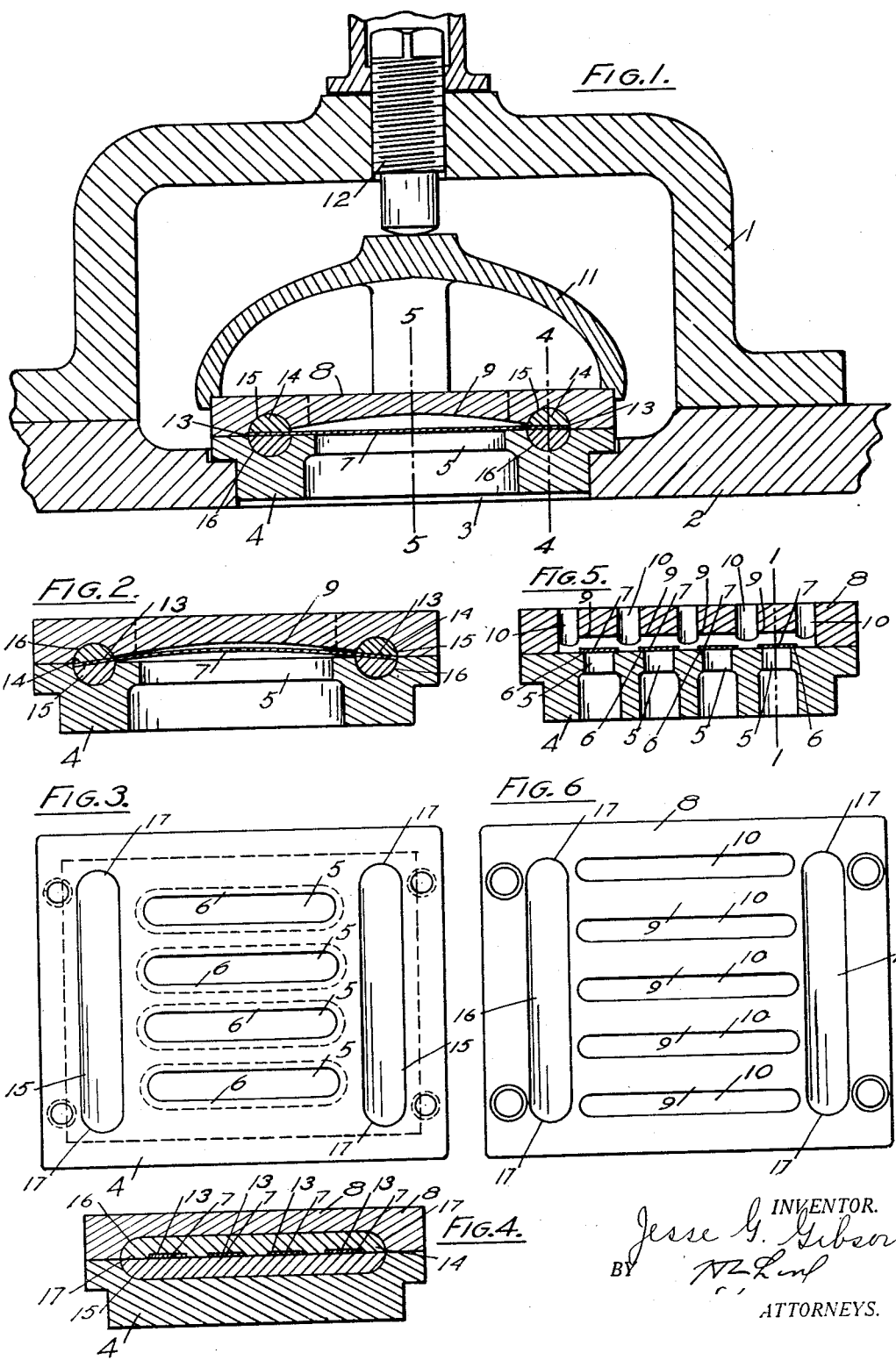

1,947,935

UNITED STATES PATENT OFFICE 1,947,935

VALVE

Jesse G. Gibson, Bradford, Pa., assignor of fifty-one per cent to Bovaird and Company, Bradford, Pa., a copartnership composed of George W. Bovaird and Joseph H. Bovaird Application October 13, 1932. Serial No. 637,605

8 Claims. (Cl. 277—46)

The present invention is designed to improve the guiding supports for feather valves giving to such supports a more definite guiding action and also preferably sealing the supports against the accumulation of carbon, or material detrimental to the movement of the valve. In the use of feather valves as commonly formed the guide supports for the valve are usually so arranged as to provide pockets in which may accumulate carbon, or other deposits, the accumulation of these interfering with the proper operation of the valve and also causing undue wear. The present invention not only gives to the feather plate a more accurate guiding support, but also seals the supports against the accumulation of carbon, or other material, and consequently improves the operation of the valve and extends the life of the parts. Features and details of the invention will appear from the specification and claims.

A preferred embodiment of the invention is illustrated in the accompanying drawing as follows:—

Fig. 1 shows a sectional view through the valve, the valve proper being on the section line 1—1 in Fig. 5.

Fig. 2 is a similar section showing the valve plate flexed.

Fig. 3 is a plan view of the seat plate.

Fig. 4, a section on the line 4—4 in Fig. 1.

Fig. 5, a section on the line 5—5 in Fig. 1.

Fig. 6, a bottom view of the guard plate.

1 marks the valve case, 2 the cylinder wall, 3 a port leading to the cylinder, and 4 a seat plate which is arranged over, or in the cylinder port. The seat plate is provided with a series of valve openings 5. Surrounding each opening there is a valve seat 6.

Feather valve plates 7 are adapted to close the openings 5, closing on the seats 6. A guard plate 8 is arranged above the seat plate. It has guard surfaces 9 against which the plates are flexed and openings 10 which are arranged between the openings 5. A pressure plate 11 rests on the guard plate and pressure is exerted on the pressure plate by means of a screw 12 extending through the case. With this construction the seat plate and guard plate are firmly secured in place through the pressure thus afforded. The ends of the feather plates extend through, or into slots 13 in rocking pins 14. These pins are arranged in opposing bearing grooves 15 and 16 in the plates 4 and 8. The ends of the grooves are so formed as to provide semi-spherical ends 17 for the complete bearings and the pins 14 are similarly shaped so that the ends of the bearing opening may be closed.

The slots 13 may be formed in any convenient manner. One way of producing them is to make the pins in halves, form the slots in one of the halves, put the halves together and unite them by welding. The feather plates, however, should make a sliding fit with the slots so as to seal the pockets at the outer ends of the plates from the material passing through the valve. In this way the valves are free to move in flexing and are properly guided to their seats and the pockets at the ends of the feather plates are sealed so that there is no accumulation of carbon to interfere with the free movement of the plates, or to subject them to undue wear. While the structure may be measurably achieved with the feather plates secured to one of the pins the feather plates are preferably slidingly mounted in both pins as this divides the endwise movement incident to flexing between the pins and gives a freer action.

What I claim as new is:—

1. In a valve, the combination of a seat having a valve opening; a resilient feather valve plate closing the seat; a guard for the feather plate; and a pivot pin at each end of the feather plate rocking with a flexure of the feather plate, the plate being slidingly mounted for endwise movement in at least one of the pins.

2. In a valve, the combination of a seat having a valve opening; a resilient feather valve plate closing the seat; a guard for the feather plate; a pivot pin at each end of the feather plate rocking with a flexure of the feather plate, the plate being slidingly mounted for endwise movement in at least one of the pins; and bearings for the pins, said bearings, pins and plate sealing the ends of the plate from the valve opening.

3. In a valve, the combination of a seat having a valve opening; a resilient feather valve plate closing the seat; a guard for the feather plate; and a pivot pin at each end of the feather plate rocking with a flexure of the feather plate, said plate being slidingly mounted for endwise movement in both pins.

4. In a valve, the combination of a seat having a valve opening; a resilient feather valve plate closing the seat; a guard for the feather plate; a pivot pin at each end of the feather plate rocking with a flexure of the feather plate, said plate being slidingly mounted for endwise movement in both pins; and bearings for the pins, said bearings, pins and plate sealing the ends of the plate from the valve opening.

5. In a valve, the combination of a seat having a valve opening; a resilient feather valve plate closing the seat; a guard for the feather plate; a pivot pin at each end of the feather plate rocking with a flexure of the feather plate, said plate being slidingly mounted for endwise movement in at least one of the pins, and bearings for the pins, the bearing, pin and plate at the sliding end of the plate sealing the end of the plate from the valve opening.

6. In a valve, the combination of a seat having a valve opening; a resilient feather valve plate closing the seat; a guard over the feather plate; and a pivot pin at each end of the feather valve, at least one of the pins having a cross slot of the cross contour of the plate and receiving the plate with a sliding fit for endwise movement.

7. In a valve, the combination of a seat having a valve opening; a resilient feather valve plate closing the seat; a guard over the feather plate; and a pivot pin at each end of the feather valve, each of said pins having a cross slot of the cross contour of the plate and receiving the plate with a sliding fit for endwise movement.

8. In a valve, the combination of a seat having a valve opening; a resilient feather valve plate closing the seat; a guard over the feather plate; and a pivot pin at each end of the feather valve, each pin being formed in halves with cross slots formed between the halves, said slots receiving the plates with sliding fits for endwise movement.

JESSE G. GIBSON.